United States Patent [19]

Lebedev et al.

[11] Patent Number: 4,910,374
[45] Date of Patent: Mar. 20, 1990

[54] WELDING COMPLEX

[76] Inventors: Vladimir K. Lebedev, ulitsa Engelsa, 25, kv. 12; Sergei I. Kuchuk-Yatsenko, prospekt 40-letia Oktyabrya, 21, kv. 93; Vasily A. Sakharnov, ulitsa Solomenskaya, 41, kv. 93; Boris A. Galyan, ulitsa Lenina, 88-92, kv. 110; Valery G. Krivenko, ulitsa Ordzhonikidze, 3, kv. 35; Grigory B. Asoyants, ulitsa Mechnikova, 18, kv. 19, all of Kiev, U.S.S.R.

[21] Appl. No.: 286,380

[22] Filed: Dec. 16, 1988

[51] Int. Cl.[4] ............................................. B23K 11/02
[52] U.S. Cl. ..................................... 219/101; 219/59.1
[58] Field of Search ................ 219/101, 103, 104, 59.1

[56] References Cited

U.S. PATENT DOCUMENTS

| | | | |
|---|---|---|---|
| 3,166,664 | 1/1965 | Paton et al. | 219/101 |
| 3,657,962 | 4/1972 | Skulsky | 90/24 C |
| 4,012,619 | 3/1977 | Lifshits et al. | 219/101 |

FOREIGN PATENT DOCUMENTS

| | | |
|---|---|---|
| 2332006 | 1/1975 | Fed. Rep. of Germany . |
| 2364502 | 10/1975 | Fed. Rep. of Germany . |
| 904244 | 3/1983 | U.S.S.R. . |

Primary Examiner—Clifford C. Shaw
Attorney, Agent, or Firm—Lilling & Greenspan

[57] ABSTRACT

A welding complex in accordance with the invention comprises a machine for resistance butt welding, means for supporting the end part of the pipeline and holding means including a platform reciprocable axially of the pipeline and a plate with a device for carrying the pipe section to be welded, rotatable by a drive between the positions of loading a pipe section and aligning it with the pipeline. For loading the holding means with the plate rotated into the loading position, by longitudinally displacing a pipe section from the accumulator, the latter is arranged alongside the platform, so that the pipe section it delivers extends at an acute angle relative to the end of the pipeline.

4 Claims, 5 Drawing Sheets

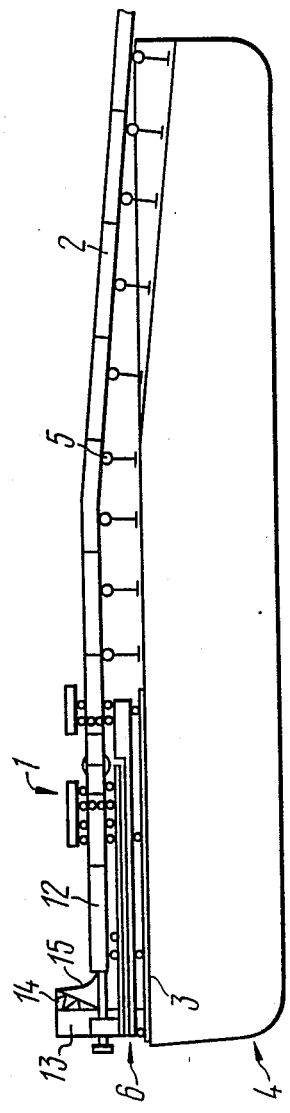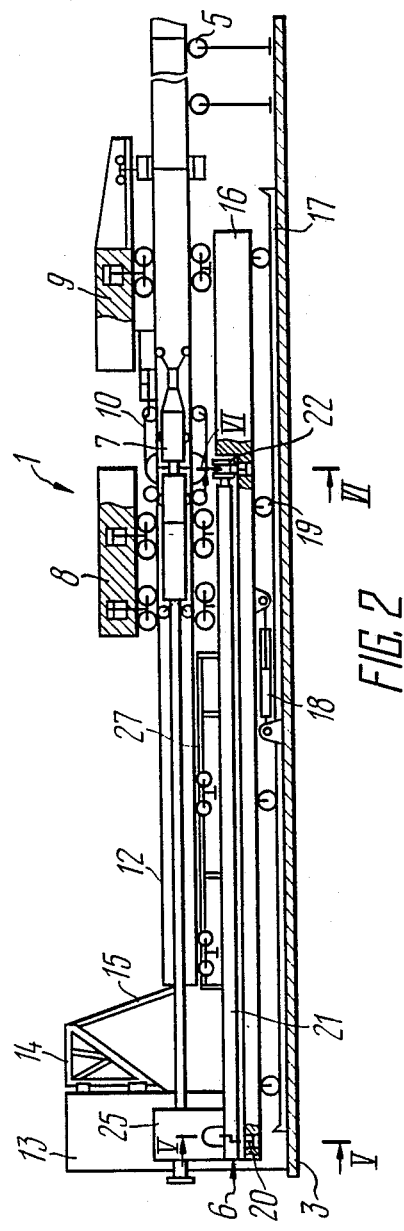

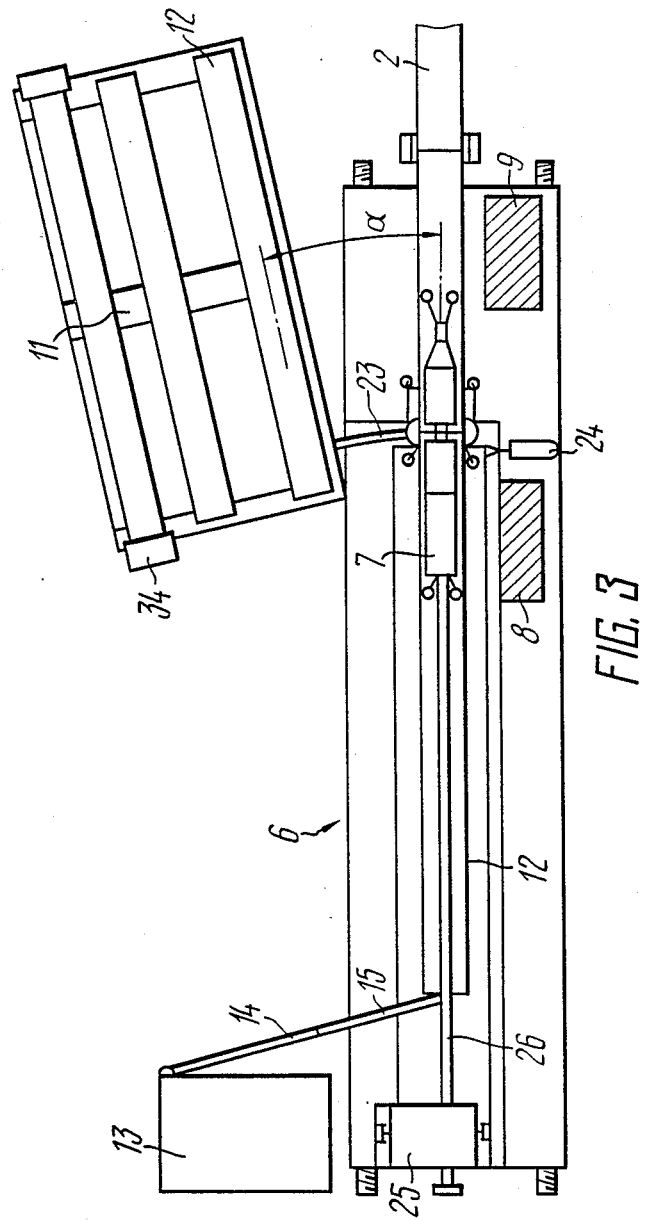

WELDING COMPLEX

FIELD OF THE INVENTION

The invention relates to welding technologies, and more particularly it relates to arrangements for resistance butt welding of annular joints of pipes in construction of continuous underwater pipelines.

DESCRIPTION OF THE PRIOR ART

The construction of continuous underwater pipelines involves the problem of performing the procedure of welding of annular joints of successive pipes in the limited space of a water-borne vessel eventually subjected to roll and pitch, where the pipe-welding equipment is mounted.

There is known an installation of laser-beam welding of pipelines accommodated on a stationary support device fast with the deck of the pipeline-laying ship, the device supporting the means for holding, aligning and retaining in the working position the pipeline and the pipe to be welded thereto (DE, B, 2515925).

The installation offers high productivity of the pipe construction process; however, the laser-beam welding technology it employs is significantly costly, to say nothing of its requiring a considerable amount of the auxiliary equipment and numerous operating personnel.

More cost-conscious is a known welding complex employing electric-arc welding for construction of an underwater pipeline (Welding Journal, September, 1978, pp. 15–21, R. L. Jones et al., "Using the gas metal arc process speeds pipelaying and reduces construction time of North Sea Pipeline"). The complex is intended for installation on the deck of a barge-type vessel and includes a device for supporting the end part of the pipeline, a machine for gas-shielded electric-arc welding, arranged in the working position in the area of the joint of the pipeline with the pipe to be welded thereto, burr-removing trimmers arranged in the working position coaxially with the pipeline along the path of its motion relative to the barge as the latter moves into its successive working position, and a stationary holding device for setting, holding and retaining the pipe to be welded, the abovementioned welding machine and the trimmers in their working position, aligned with the device for supporting the end part of the pipeline. Laterally offset from the common axis of the pipeline and the pipe to be welded thereto is a store or accumulator operated for storing pipes to be welded and successively delivering them at the loading position. The pipes are stacked in the accumulator to extend parallel with the pipeline, their loading being effected by a pipe-handling device moving a successive pipe into the position of abutting against the pipeline in a flat-parallel motion horizontally and vertically. The stability of the relative positions of the end of the pipeline and the pipe being welded thereto is maintained throughout the welding operation by the specific design features of the barge and the procedure of its retaining relative to the bottom of the water reservoir in question.

However, the productivity of the welding process performed by the last-described welding complex is not adequately high, as the electric-arc welding technology is characterized by a high input of manual labor and a considerable amount of the required auxiliary equipment whose accommodation in the limited working space presents serious problems.

Resistance butt welding as a technology significantly more productive, providing for fine quality of welds and requiring less bulky equipment has not been employed as yet in the environment of laying underwater pipelines.

However, the use of resistance butt welding machine in the last-described complex of the prior art would have been hindered by the complexity of the task of ensuring strict axial alignment of the pipes being joined under roll and pitch conditions, and also by the fact that the insertion of a relatively elongaged inter-pipe welding machine or of an internal burr-removing trimmer into the pipe to be welded requires additional working area which is at least equal to the respective lengths of the inter-pipe welding machine or of the internal trimmer lengthwise of the carrier vessel.

SUMMARY OF THE INVENTION

It is the main object of the present invention to create an economical and efficient welding complex for constructing continuous underwater pipelines, providing for fine quality of the welds.

It is a specific object of the present invention to provide prerequisites for implementing the highly efficient technology of resistance butt welding of pipe sections in a limited space of the carrier vessel susceptible to roll and pitch.

The term "a pipe section" used here and hereinbelow is meant to described a length of the pipe to be welded to the pipeline at a single go. It may be a single pipe length or several pipe lengths pre-welded together in advance for further handling.

These and other objects are attained in a welding complex for construction of a continuous underwater pipeline, adapted to be installed aboard a ship, comprising a welding machine positionable at a joint of the pipeline with a pipe section to be welded, thereto, burr-removing trimmers positionable coaxially with the pipeline for displacement relative thereto in the joint area, a support device for the end part of the pipeline, a rotatably mounted holding device for setting, holding and retaining the pipe section to be welded, the welding machine and the trimmers, axially aligned with the end part of the pipeline, an accumulator for storing and delivering successive pipe sections at a loading position, laterally offset from the common axis of the pipeline and of the pipe section to be welded thereto.

In the welding complex in accordance with the invention the holding device includes a platform movable along the common axis of the pipeline and of the pipe section to be welded thereto by the machine for resistance butt welding and a plate with a means for carrying the pipe section to be welded, mounted on a pivot carried by the platform for rotation between the loading position and the position of aligning the pipe section to be welded, and operatively connected with a drive for its rotation, the accumulator being mounted so that a pipe section being delivered extends at an angle relative to the end part of the pipeline, for its longitudinal displacement from the accumulator into the holding device upon the latter's plate having been rotated into the loading position.

The disclosed structure of the welding complex provides for implementing resistance butt welding in construction of continuous underwater pipelines, as the mobility of the platform carrying the whole welding equipment involved in the welding operation enables it to follow the moving end of the pipeline in combination with the loading of successive pipe sections from the joint side, feasible owing to the disclosed arrangement of the accumulator and the design of the rotatable plate, ensuring the accuracy of the alignment and permanence of the gap between the edges being welded, and that with a reduced overall length of the equipment of the welding complex. Furthermore, the disclosed structure allows to handle longer pipe sections, which additionally enhances the efficiency of the pipeline construction procedure by reducing the number of the joints to be welded "on the site".

Depending on the length and diameter of pipe sections to be welded, the resistance butt welding machine incorporated in the welding complex of the invention can be either an inter-pipe machine, i.e. a machine insertable into the pipes being welded, or a machine for mounting externally on the pipes. In the first-mentioned case it is preferably mounted on the rotatable plate, and in the second case, on the platform of the holding device.

To simplify the structure of the holding device, it is expedient that the pivot for rotation of the plate of the holding device should include the piston rod of a hydraulic cylinder mounted on the platform in axial alignment with the common axis of the pipeline and of the pipe section to be welded thereto, at the side of the end of the pipe section opposite to its end to be welded, there being preferably mounted at the side of the end to be welded on the platform at least one more hydraulic cylinder adapted to cooperate with the plate in the position of aligning the pipe section to be welded, for assisting the first-mentioned hydraulic cylinder in aligning the axis of the pipe section to be welded with the axis of the pipeline in one and the same horizontal plane.

BRIEF DESCRIPTION OF THE DRAWINGS

The present invention will be further described in connection with its embodiments, with reference being made to the accompanying drawings, wherein:

FIG. 1 shows schematically a pipelaying barge having mounted thereon a welding complex embodying the invention;

FIG. 2 shows schematically in more detail the general view of the welding complex;

FIGS. 3 and 4 show a view in plan of the welding complex, respectively, in the working and loading positions;

DESCRIPTION OF THE PREFERRED EMBODIMENTS

Figure 4:
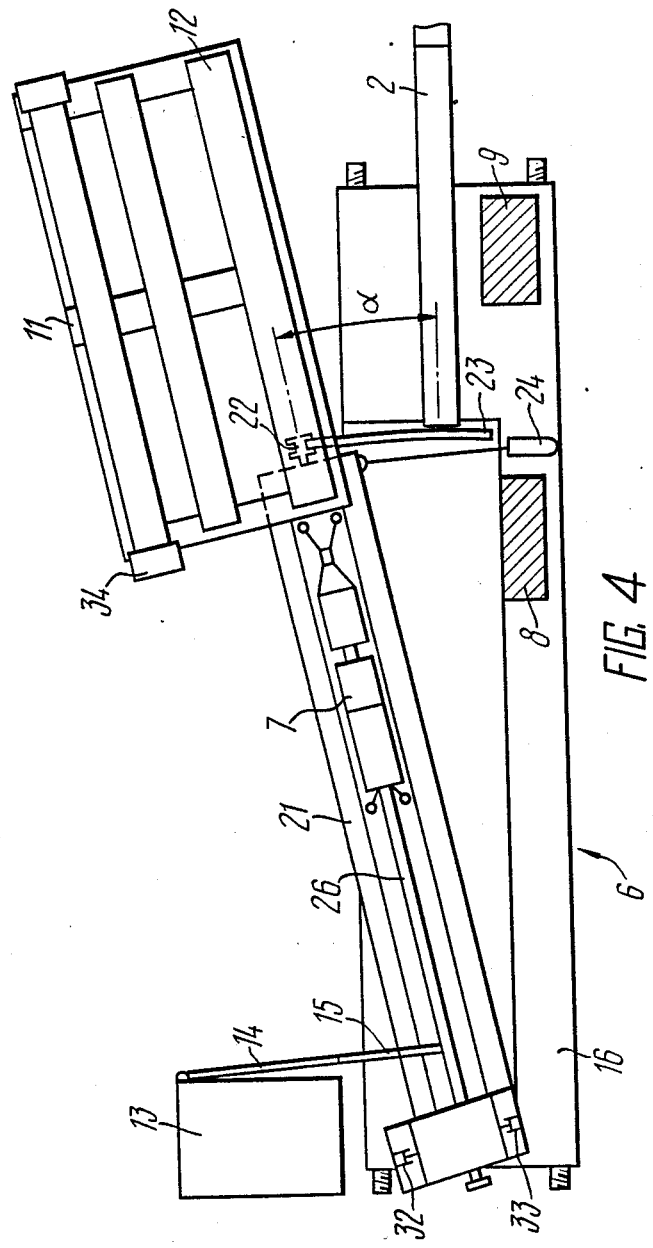

Referring now in particular to the appended drawings, a welding complex 1 (FIG. 1) for constructing a continuous underwater pipeline 2 is mounted on the deck 3 of a barge 4. The complex 1 comprises a device 5 for supporting the end part of the pipeline 2, in the form of a roller table installed on the deck 3, and a holding device 6 carrying an inter-pipe welding machine 7 (FIG. 2) for resistance butt welding, clamping machanisms 8 and 9, and an external burr-removing trimmer 10. Laterally offset from the device 6 is an accumulator 11 (FIGS. 3, 4) for storage and successive delivery of pipe sections 12 to be welded, each section being either a single pipe length or several pipe lengths pre-welded together for further handling.

The welding complex 1 (FIG. 1) is supplied with power from a power station 13 (FIGS. 3 and 4) mounted jointly with a control unit (not shown) on the deck 3 (FIG. 1) of the barge 4 and electrically connected with the inter-pipe welding machine 7 via a rotatable boom 14 (FIG. 2) supporting a supply of power cable 15.

In accordance with the invention, the holding device 6 includes a platform 16 mounted for reciprocation on the deck 3 along rails 17 extending axially of the pipeline 2. The platform 16 is associated with an actuator 18 in the form of a power cylinder pivotally mounted on the deck 3 and having its piston rod pivotally connected to the underside of the platform 16 in the area of its wheels 19. Mounted for rotation on the platform 16 about a vertical pivot 20 is a plate 21 with a guide roller 22 mounted on its distal end for rolling along an arcuate rail 23 (FIG. 4) provided on the platform 16, as the plate 21 is rotated about the pivot 20. The plate 21 is associated with a drive 24 for its rotation in the form of a double-acting hydraulic cylinder having its housing pivotally mounted on the platform 16 and its piston rod pivotally joined to the plate 21.

Figure 5:
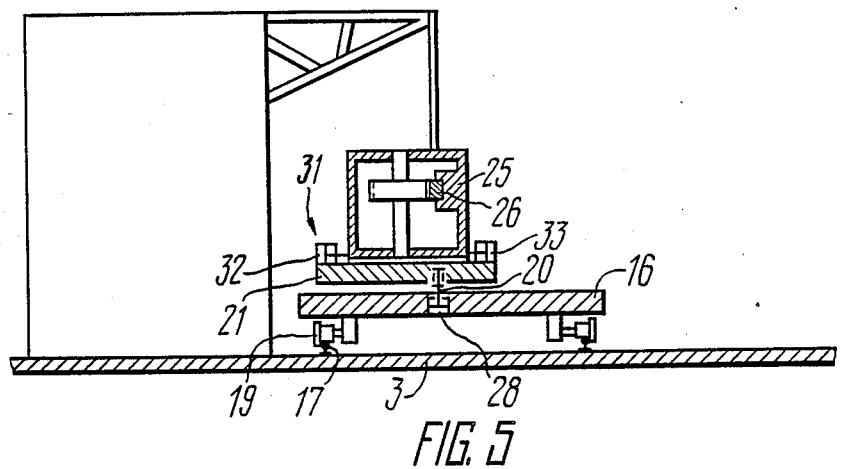
FIG. 5 is a sectional view taken on line V—V of FIG. 2.

Mounted on the plate 21 (FIG. 5) in the area of its pivot 20 is the motion mechanism 25 operatively connected with a rod 26 carrying the inter-pipe welding machine 7 which can be any suitable known inter-pipe machine for resistance butt welding of pipes (DE, B, 2918082).

The motion mechanism 25 of the present embodiment is a rack-and-pinion mechanism; however, it can be any other suitable mechanism for driving a member through a reciprocating motion, e.g. a hydraulic cylinder. Overlying the opposite, distal end of the plate 21 is a clamping mechanism 8 (FIG. 2) supported by the platform 16 for retaining the pipe section 12 received about the welding machine 7 in its position of alignment with the pipeline 2, relative to the platform 16. The clamping mechanism 8 can be any suitable known apparatus, e.g. an apparatus of the suspension trolley type incorporated in the known welding complex (SU, A, 904244), having its housing fast with the platform 16.

Mounted intermediate the motion mechanism 25 and the clamping mechanism 8 on the plate 21 is a device 27 for carrying the pipe section 12 to be welded, which in the presently described embodiment is in the form of a driven roller table facilitating axial adjustment of the pipe section 12.

In the preferred embodiment of the present invention, the vertical pivot 20 of the plate is the piston rod of a hydraulic cylinder 28 (FIG. 5) fastened on the platform 16.

Figure 6:
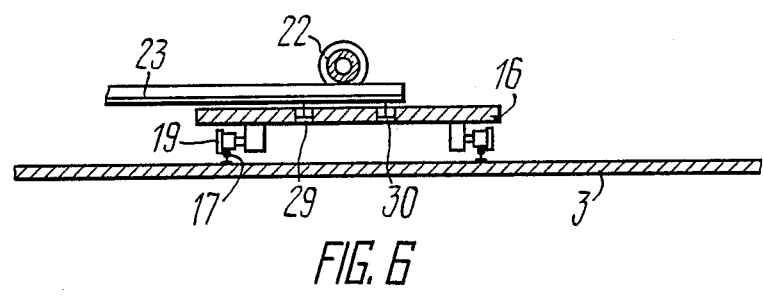
FIG. 6 is a sectional view taken on line VI—VI of FIG. 2.

Underlying the distal end of the plate 21 are hydraulic cylinders 29 (FIG. 6) and 30 mounted on the platform 16 and supporting the arcuate rail 23 on their piston rods. In their combination, the cylinders 28 to 30 present an arrangement for adjusting and correcting the position of the axis of the pipe section 12 to be welded relative to the axis of the end of the pipeline 2, i.e. for positive alignment of these two axes in one and the same horizontal plane. Positive alignment of these two axes in one and the same vertical plane is provided for by the hydraulic cylinder 24 capable of rotating the plate 21 (FIGS. 3 and 4) and a mechanism 31 (FIG. 5) for its horizontal displacement, including two hydraulic cylinders 32 and 33 mounted on the plate 21 and having their piston rods abutting against the housing of the mechanism 25 to the opposite sides of the rod 26.

The clamping mechanism 9 (FIGS. 2 and 3) mounted on the platform 16 beyond the outline of the plate 21 is intended for retaining the platform 16 with respect to the end of the pipeline 2 in the working position. The mechanism 9 is preferably of the same design as the clamping mechanism 8, its housing supporting for axial reciprocation the external burr-removing trimmer 10 of any suitable known structure (US, A, 3657962).

The accumulator 11 for storage and successive delivery of pipe sections 12 to be welded, of any suitable known structure (DE, A, 2364502), is fixedly secured on the deck 3 of the barge 4 alongside the platform 16 (FIGS. 3 and 4) for the axis of the pipe section 12 being delivered, which is the leading position of the welding complex 1, to extend at an angle α to the axis of the pipeline 2. The vertex of the angle α belongs to the imaginary extension of the pipeline 2, beyond its end. The actual value of the angle α is selected from the overall layout considerations, to provide for the minimum required space and minimized stroke of the hydraulic cylinder 24 operable for rotating the plate 21 through this angle; however, in principle, this value can be varied in a fairly bread range.

The accumulator 11 is equipped with scraping tools 34 for preparing the ends of a pipe section 12 for welding.

Figure 7:
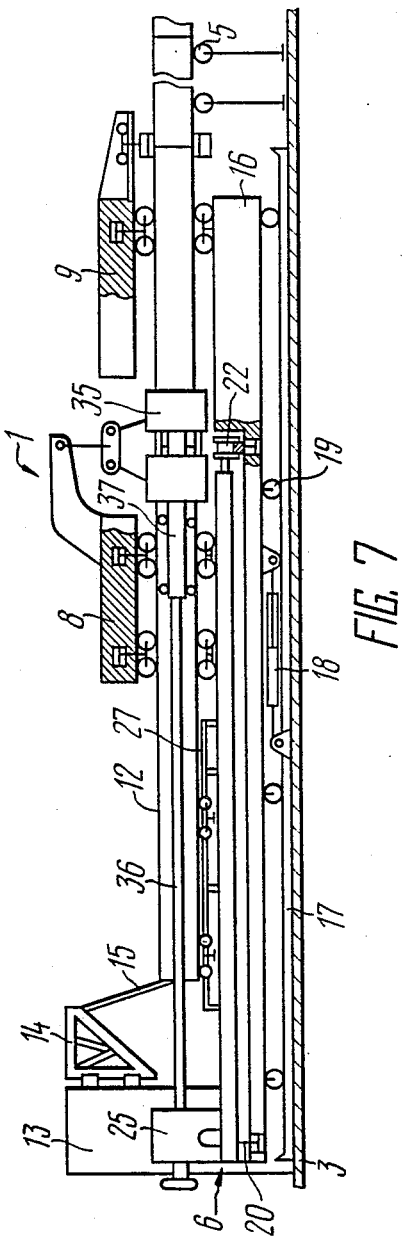
FIG. 7 shows schematically the general view of a modified embodiment of the welding complex in accordance with the invention.

FIG. 7 of the appended drawings illustrates schematically a modified embodiment of the invention, with an externally mounted machine 35 for resistance butt welding incorporated in the welding complex 1 instead of an inter-pipe machine. The machine 35 can be of any suitable known structure (DE, B, 2332006).

The externally mounted resistance butt welding machine 35 is operatively connected to the platform 16 through the clamping mechanism 8, with the motion mechanism 25 of this embodiment having operatively connected thereto a rod 36 with an internal burr-removing trimmer 37 of any suitable known structure (US, A, 3745319).

In other respects, this embodiment of the welding complex 1 is similar to the embodiment described hereinabove.

The welding complex 1 of the present invention is operated, as follows.

A pipe section 12 with its ends treated in advance by the scraping tools 34 is delivered by the accumulator 11 (FIGS. 3 and 4) to the loading position. The drive 24 is energized to rotate the plate 21 jointly with the inter-pipe welding machine 7 through the angle α about the pivot 20 from the initial position of alignment of the geometric axis of the inter-pipe machine 7 with the axis of the pipeline 2. With the plate 21 thus rotating, its roller 22 is guided by the arcuate rail 23.

Alternatively, when the welding complex 1 incorporates the externally mounted welding machine 35, the latter remains on the platform 16 with the plate 21 rotating, and the internal trimmer 37 rotates jointly with the plate 21.

In the loading position, the inter-pipe welding machine 7 (or, correspondingly, the internal trimmer 37) is coaxial with the pipe section 12 which is fed by the driven roller table (not shown) underlying the pipe section 12 on the accumulator 11 to move onto the inter-pipe machine 7 (or the internal trimmer 37).

The drive 24 is activated in the reverse direction, and the plate 21 jointly with the inter-pipe welding machine 7 (or the internal trimmer 37) and the pipe section 12 received thereabout is rotated into the initial position of alignment, abutting against the housing of the clamping mechanism 8.

The pipe section 12 is moved axially, jointly with the inter-pipe welding machine 7 (or the internal trimmer 37) towards the pipeline 2 to abut against its end face, and is pre-clamped by the mechanism 8, whereafter there is performed positive alignment of the axis of the pipe section 12 with the axis of the pipeline 2 in one and the same horizontal plane by jointly operating in coordination the hydraulic cylinders 28 to 30, and in one and the same vertical plane by jointly operating in coordination the mechanism 31 for horizontal displacement of the plate 21 and its rotation drive 24. In the embodiment with the inter-pipe welding machine 7, the motion mechanism 25 is operated to project this machine 7 partly into the pipeline 2 by the required extent, to acquire its working position with respect to the joint of the pipeline 2 with the pipe section 12, as shown in FIGS. 2 and 3, whereafter the corresponding mechanisms of the inter-pipe welding machine 7 are operated for final centerling and clamping of the pipe section 12 to be welded with respect to the pipeline 2. Simultaneously, the clamping mechanism 8 is operated to release the pipe section 12.

In the embodiment with the externally mounted welding machine 35 (FIG. 7), the mechanism 25 is operated to project the internal trimmer 37 into the pipeline 2 by the required extent, while the pipe section 12 is moved into the externally mounted pipe-welding machine 35 for its final centering and clamping from outside. The clamping mechanism 8 is operated to release the pipe section 12, with the clamping mechanism 9 being in its working state of retaining the plateform 16 with respect to the end of the pipeline 2.

Should a roll and/or pitch situation make the barge 4 shaft relative to the pipeline 2, the latter in its cooperation with the platform 16 through the clamping mechanism 9 and the clamps of either the inter-pipe welding machine 7 or the externally mounted welding machine 35 would make the platform 16 roll along the rails 17 jointly with the entire equipment of the welding complex 1 engaged in the welding procedure. Thus, the mobility of the platform 16 guarantees the reliability and accuracy of the alignment and permanence of the preset relative axial positions of the welded edges of the pipe section 12 and pipeline 2.

If the platform 16 is displaced in its working position from its substantially central position lengthwise of the rails 17, the actuator 18 is operated to restore the platform 16 to its central position providing the necessary latitude for welding on tolerably rough seas. Otherwise, the actuator 18 functions as a hydraulic shock-absorber.

In the abovedescribed working position of the welding complex 1 either the inter-pipe machine 7 or the externally mounted machine 35 is operated to perform the welding of the joint in the specified procedure.

With the welding procedure completed, the mechanism 25 is operated to retract either the inter-pipe welding machine 7 or the internal trimmer 37 beyond the welded joint, removing the internal burrs (flash).

External burrs (flash) are removed by the external trimmer 10, or else, in the embodiment with the externally mounted welding machine 35, by a trimming device incorporated in the machine 35.

The clamping mechanism 9 is operated then for its rollers to release the pipeline 2 (and in the embodiment with the externally mounted welding machine 35 the latter is also operated to release the pipeline 2), and the barge 4 is advanced through a required distance relative to the pipeline 2 (with the last-mentioned pipe section 12 welded thereto) which freely rolls along the roller table of the support device 5, until the remote (free) end of the last-welded pipe section 12 acquires the position which is initial for welding the next joint. With the barge 4 arrested, the pipeline 2 is retained once again relative to the platform 16 by the clamping mechanism 9, and the abovedescribed operating cycle is repeated.

It can be seen from the above description that the disclosed welding complex is compact and reliable in operation. Its layout allows to reduce the length of the space occupied by the welding equipment and to cut down the amount of auxiliary equipment.

Considering that the incorporation of the rotatable plate has eliminated the necessity of retracting the interpipe welding machine (or the internal trimmer) from the joint by the full length of the successive pipe section to be welded, the length of the latter can be stepped up, which provides for having less joints to be welded "on the site". The abovesaid enhances the productivity of pipeline construction in addition to the essentially higher efficiency attained owing to the implementation of resistance butt welding of pipes under offshore conditions.

What is claimed is:

1. A welding complex for construction of a continuous underwater pipeline, adapted to be installed on the deck of a carrier vessel, comprising:
    means for supporting the end part of the pipeline;
    a machine for resistance butt welding positionable in the area of a joint of the pipeline with a pipe section to be welded thereto;
    trimming means positionable coaxially with the pipeline for motion relative thereto toward the joint area;
    rotatable holding means operable for setting, holding and retaining a pipe section to be welded, said resistance butt welding machine and said trimming means in axial alignment with the end part of the pipeline, including:
    a platform reciprocable along the common axis of the pipeline and the pipe section to be welded thereto;
    a plate mounted on a pivot means for rotation between a loading position and a pipe section aligning position, associated with a drive for its rotation;
    means for carrying a pipe section to be welded, mounted on said plate;
    accumulating means adapted for storage and successive delivery of pipe sections at the loading position, laterally offset from the common axis of the pipeline and the pipe section aligned therewith, so that a pipe section being delivered extends at an angle relative to the end part of the pipeline for its longitudinal displacement from said accumulating means into said holding means, with said plate of said holding means having been rotated into the loading position.

2. A welding complex according to claim 1, wherein said machine for resistance butt welding is a machine adapted to be received internally of the pipe to be welded, mounted on said rotatable plate of said holding means.

3. A welding complex according to claim 1, wherein said machine for resistance butt welding is a machine adapted to be received externally on the pipe to be welded, mounted on said reciprocable platform of said holding means.

4. A welding complex according to claim 1, comprising a hydraulic cylinder aligned with the common axis of the pipeline and the pipe section to be welded thereto at the side of the free end of said pipe section, having its piston rod affording said pivot means of said rotatable plate, and at least one more hydraulic cylinder mounted on said platform at the side of the joint end of said pipe section to be welded, having its piston rod cooperating with said rotatable plate in the position of aligning said pipe section to be welded, for assisting said first-mentioned hydraulic cylinder in aligning the axis of said pipe section to be welded with the axis of the pipeline in one and the same horizontal plane.

* * * * *